United States Patent
Zhou et al.

(10) Patent No.: US 9,154,440 B2
(45) Date of Patent: *Oct. 6, 2015

(54) SYSTEM AND METHOD FOR IDENTIFYING MULTIPLE PATHS BETWEEN NETWORK NODES

(71) Applicant: Google Inc., Mountain View, CA (US)

(72) Inventors: Junlan Zhou, Sunnyvale, CA (US); Zhengrong Ji, Sunnyvale, CA (US); Yuguang Wu, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 13/848,430

(22) Filed: Mar. 21, 2013

(65) Prior Publication Data

US 2013/0215766 A1 Aug. 22, 2013

Related U.S. Application Data

(63) Continuation of application No. 12/533,187, filed on Jul. 31, 2009, now Pat. No. 8,432,801.

(51) Int. Cl.
*H04L 12/863* (2013.01)
*H04L 12/701* (2013.01)
*H04L 12/707* (2013.01)
*H04L 12/26* (2006.01)

(52) U.S. Cl.
CPC ............. *H04L 47/622* (2013.01); *H04L 45/00* (2013.01); *H04L 45/24* (2013.01); *H04L 43/12* (2013.01)

(58) Field of Classification Search
CPC ....... H04L 45/00; H04L 47/622; H04L 45/24; H04L 63/0236; H04L 12/4641; H04L 45/02; H04L 45/123; H04L 45/26; H04W 40/26; H04W 40/12

See application file for complete search history.

(56) References Cited

U.S. PATENT DOCUMENTS

| | | | |
|---|---|---|---|
| 7,869,394 B1 | 1/2011 | Boden, Jr. et al. | |
| 7,872,989 B1 | 1/2011 | Tong et al. | |
| 8,259,574 B2 * | 9/2012 | Zhou et al. | 370/231 |
| 8,432,801 B2 * | 4/2013 | Zhou et al. | 370/231 |
| 2003/0016687 A1 | 1/2003 | Hill | |
| 2003/0199252 A1 | 10/2003 | Tiedemann et al. | |

(Continued)

OTHER PUBLICATIONS

International Search Report and Written Opinion PCT/US2010/043662, Date of Mailing Apr. 26, 2011.

(Continued)

*Primary Examiner* — Yee Lam
(74) *Attorney, Agent, or Firm* — Edward A. Gordon; John D. Lanza; Foley & Lardner LLP (57) ABSTRACT

Aspects of the invention pertain to transmitting packet data across a computer network. The packets may be sent via one or more distinct routes from a source to a destination. Each route may employ multiple routers disposed along the network. Non-colliding routes are determined by transmitting pairs of probe packets along the routes. A first probe packet has a maximal length, and a second probe packet has a minimal length. Depending on the order of arrival of the probe packets, the system determines whether two transport layer ports at the destination device collide. If there is a collision, then the system searches for a set of non-colliding ports. Once the non-colliding ports are determined, application data may be sent as packets along the different routes to those ports.

15 Claims, 6 Drawing Sheets

(56) References Cited

U.S. PATENT DOCUMENTS

| | | |
|---|---|---|
| 2003/0210685 A1 | 11/2003 | Foster et al. |
| 2003/0217039 A1 | 11/2003 | Kurtz et al. |
| 2004/0066743 A1 | 4/2004 | Shimojo et al. |
| 2005/0185632 A1 | 8/2005 | Draves et al. |
| 2006/0045098 A1 | 3/2006 | Krause |
| 2007/0011319 A1 | 1/2007 | McClure et al. |
| 2007/0070909 A1 | 3/2007 | Reeve |
| 2007/0283007 A1 | 12/2007 | Keir et al. |
| 2008/0008178 A1 | 1/2008 | Tychon et al. |
| 2008/0267201 A1 | 10/2008 | Yang |
| 2009/0092043 A1 | 4/2009 | Lapuh et al. |
| 2009/0259748 A1 | 10/2009 | McClure et al. |
| 2010/0054117 A1 | 3/2010 | Southworth et al. |

OTHER PUBLICATIONS

Canadian Office Action for Application No. 2,769,722 dated Nov. 5, 2013.

* cited by examiner

SYSTEM AND METHOD FOR IDENTIFYING MULTIPLE PATHS BETWEEN NETWORK NODES

CROSS-REFERENCE TO RELATED APPLICATIONS

The present application is a continuation of U.S. patent application Ser. No. 12/533,187, filed Jul. 31, 2009, the disclosure of which is incorporated herein by reference.

BACKGROUND OF THE INVENTION

1. Field of the Invention

The invention relates generally to routing data in computer networks. More particularly, the invention pertains to identifying multiple paths between source and destination nodes in computer networks.

2. Description of Related Art

With a networked computer, it is possible to increase the communication bandwidth or the availability of network connectivity by using multiple interfaces concurrently to aggregate bandwidth. One strategy of bandwidth aggregation is known as Link Aggregation ("LAG"). Another is known as Equal Cost Multiple Path ("ECMP").

Such strategies allow router or switch nodes in the network to load balance traffic across multiple outgoing links. The outgoing link of a packet is often determined based on the hash value of information (source IP address, destination IP address, source port, destination port) in the packet header. A node may maximize its application throughput to a destination by identifying a set of port pairs (source port, destination port) to send traffic across multiple paths available to the destination.

However, specific implementations of such bandwidth allocation, e.g., the use of hashing functions on switches/routers, are often proprietary. Furthermore, the results of such hashing functions may depend on the seed value of individual switches. It is not feasible for a source node to determine a priori if port pairs are to be hashed to different paths to a destination node, especially in wide area network where end hosts have little knowledge of network topologies and router/switch configurations in between them.

In contrast, the invention provides non-proprietary systems and methods that identify and employ multiple paths between network nodes.

SUMMARY OF THE INVENTION

In one embodiment, a method for identifying ports to support data packet traffic between a source device and a destination device in a computer network is provided. The method comprises setting a set $S_D$ of destination ports p the destination device is configured to listen to; selecting a subset $S_k^D$ from the set $S_D$ for serving the data packet traffic between the source device and the destination device; choosing a port p in the set $S_D$ for analysis; determining whether the chosen port p collides with any of the ports in the subset $S_k^D$; and if there is a collision involving the chosen port p, eliminating the chosen port p from the set $S_D$.

In one example, the chosen port p is removed from the set $S_D$ prior to determining whether there is a collision. In another example, if there is no collision, the method further comprises modifying the subset $S_K^D$ according to the following equation: $S_{K\ modified}^D = S_K^D \cup \{p\}$. In this case, the method may further comprise repeating the selecting, choosing, determining and eliminating operations for k rounds, wherein a new port p is chosen in each round. In one alternative, after each port p is identified that does not collide with any of the ports in the subset $S_D^K$, the method further comprises sending the data packet traffic from the source device to the destination device via at least two of the non-colliding ports.

In another example, determining whether the chosen port p collides with any of the ports in the subset $S_k^D$ includes transmitting a pair of probe packets from the source device to the destination device. In one alternative, a first one of the pair of probe packets is of a maximum packet transmission size. In this case, a second one of the pair of probe packets may be of a minimum packet transmission size. And in a further example, the port p is randomly selected from the set $S_D$.

In accordance with another embodiment, a method of determining port collisions when transmitting traffic between a source device and a destination device in a computer network is provided. The method comprises setting a set $S_D$ of destination ports p the destination device is configured to listen to; selecting a subset $S_k^D$ from a set $S_D$ for serving the data packet traffic between the source device and the destination device; initializing a test subset of ports $S_Y$ to be equal to $S_K^D$; choosing a port p' from the set $S_Y$ and choosing a port p from the set $S_D$ but not in $S_k^D$ for analysis; sending a pair of probe packets from the source device to the destination device via p and p'; evaluating arrivals of the pair of the probe packets at the destination device to determine if there is a collision at ports p and p'; and if there is no collision, then identifying port p as a selected port for transmitting data packets between the source device and the destination device.

In one example, the destination device sends an acknowledgement to the source device upon the arrival of the pair of probe packets. Here, the acknowledgement may identify whether there is a collision between p and p'.

In another example, the port p' is removed from $S_Y$ upon choosing. In this case, the method may further comprise repeating the choosing, sending, evaluating and identifying operations for each port in $S_Y$ until all of the ports have been removed from $S_Y$.

In yet another example, a first one of the pair of probe packets is of a maximum packet transmission size and a second one of the pair of probe packets is of a minimum packet transmission size. In this case, a collision may be determined if the pair of probe packets are received in order of transmission.

In accordance with another embodiment, a processing system for transmission of data packets between a source device and a destination device in a computer network is provided. Here, the computer network includes a plurality of nodes for routing the data packets between the source and destination devices. The processing system comprises a memory for storing data and a processor operatively coupled to the memory for reading the data from and writing the data to the memory. The processor is configured to select a subset $S_k^D$ from a set $S_D$ of ports p the destination device is configured to listen to. The subset $S_k^D$ is configured to serve the data packet traffic between the source device and the destination device. The processor is further configured to choose a port p in the set $S_D$ for analysis, to determine whether the chosen port p collides with any of the ports in the subset $S_k^D$, and, if there is a collision involving the chosen port p, to eliminate the chosen port p from the set $S_D$.

In one example, the processor determines whether the chosen port p collides with any of the ports in the subset $S_k^D$ by transmitting a pair of probe packets to the destination device. In this case, the processor may determine whether there is a collision based upon an order of arrival of the transmitted probe packets. In an alternative, the processor comprises the source device.

BRIEF DESCRIPTION OF THE DRAWINGS

FIG. 1 illustrates a computer network for use with aspects of the invention.

DETAILED DESCRIPTION

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

FIG. 1 presents a schematic diagram of a computer network 100 depicting various computing devices that can be used in a networked configuration in accordance with aspects of the invention. For example, computer network 100 may have a plurality of computers 102, 104, 106 and 108 as well as other types of devices such as portable electronic devices such as a mobile phone 110 and a PDA 112. Such computing devices may be interconnected via a local or direct connection 114 and/or may be coupled via a communications network 116 such as a LAN, WAN, the Internet, etc. The communications network 116 may include multiple nodes comprising switches or routers, as will be discussed below.

Each computing device may include, for example, one or more processing devices (e.g., a CPU) and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106 and 108 may be a personal computer, server, etc. By way of example only, computers 102 and 106 may be personal computers while computer 104 may be a server and computer 108 may be a laptop.

Each computer such as computers 102 and 104 contains a processor, memory/storage and other components typically present in a computer. For instance, memory/storage stores information accessible by processor, including instructions that may be executed by the processor and data that may be retrieved, manipulated or stored by the processor. The memory/storage may be of any type or any device capable of storing information accessible by the processor, such as a hard-drive, ROM, RAM, CD-ROM, flash memories, write-capable or read-only memories. The processor may comprise any number processing elements, such as sub-processing units operating in a parallel-processing configuration. Alternatively, the processor may be a dedicated controller for executing operations, such as an ASIC.

Figure 2:
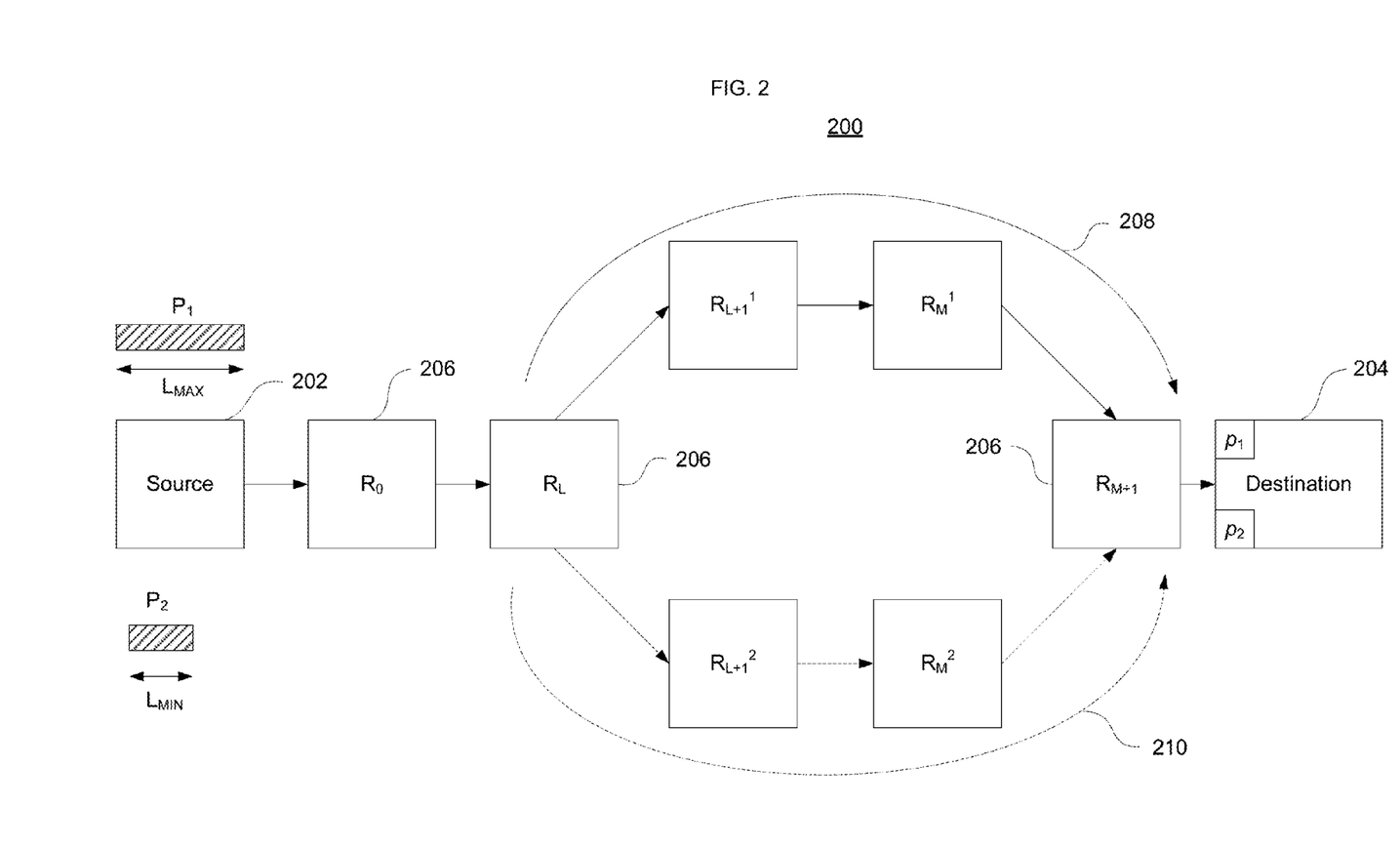
FIG. 2 illustrates aspects of a network having multiple routes in accordance with the invention.

The communications network 116 is preferably configured to handle data packets (e.g., packets $P_1$ and $P_2$) using one or more nodes. FIG. 2 illustrates a network configuration 200, where a source device 202 (e.g., computer 102) may send data to a destination device 204 (e.g., computer 104) via one or more nodes 206 in the network. As shown, each node may comprise a router/switch such as router $R_0$, $R_J$, etc.

The routers may include a processor such as a CPU, as well as memory for storing/queuing buffered data packets. The packets are preferably queued in a first-in, first-out ("FIFO") order. The routers may be arranged in the network so that packets from the source device 202 may be passed to the destination device 204 via multiple alternative routes. Identifying such routes enables the system to efficiently route the packets. By way of example, FIG. 2 illustrates a first path 208 along the route $R_0$, $R_L$, $R_{L+1}^1$, $R_M^1$ and $R_{M+1}$, as well as a second path 210 along the route $R_0$, $R_L$, $R_{L+1}^2$, $R_M^2$ and $R_{M+1}$.

In accordance with aspects of the invention, several propositions or requirements regarding analyzing packet routing through the network are set forth. The first proposition is that there is no out of order delivery of packets sent from the source device to the destination device if these packets traverse the same route, unless a link failure occurs and causes a route change at a router in between its transmissions of these packets.

A second proposition is that if two consecutive packets traverse different routes, they may arrive out of order at the destination. The probability of out of order delivery is maximized when the size of first probe packet is maximized and that of second probe packet is minimized.

And a third proposition is that if two consecutive probe packets $P_1$ and $P_2$ of respective lengths $L_{max}$ and $L_{min}$ (e.g., the largest and smallest packet lengths supported by node $R_0$) traverse different routes yet arrive in order at the destination, the path traversed by $P_2$ experiences much larger queuing and/or transmission delay than $P_1$. In this case, it may be of little gain to split the data traffic across the two paths traversed by $P_1$ and $P_2$, since the throughput improvement is marginal.

Assume source device 202 is configured to initiate a data intensive application (such as a file transfer) that sends a large amount of traffic (e.g., 10 Mbytes) from its port X to destination device 204. According to one aspect, $S_D$ is defined as a set of destination ports p the destination device 204 is listening to and can receive data from the source device 202. In this embodiment, the invention allows the source device 202 or other associated device to discover N paths each served by a destination port in $S_N^D$ ($S_N^D \subset S_D$) of the destination device 204. The source device 202 thus can split its traffic across these N paths, for example by establishing N TCP/UDP sessions, one to each destination port in $S_N^D$.

Figure 3:
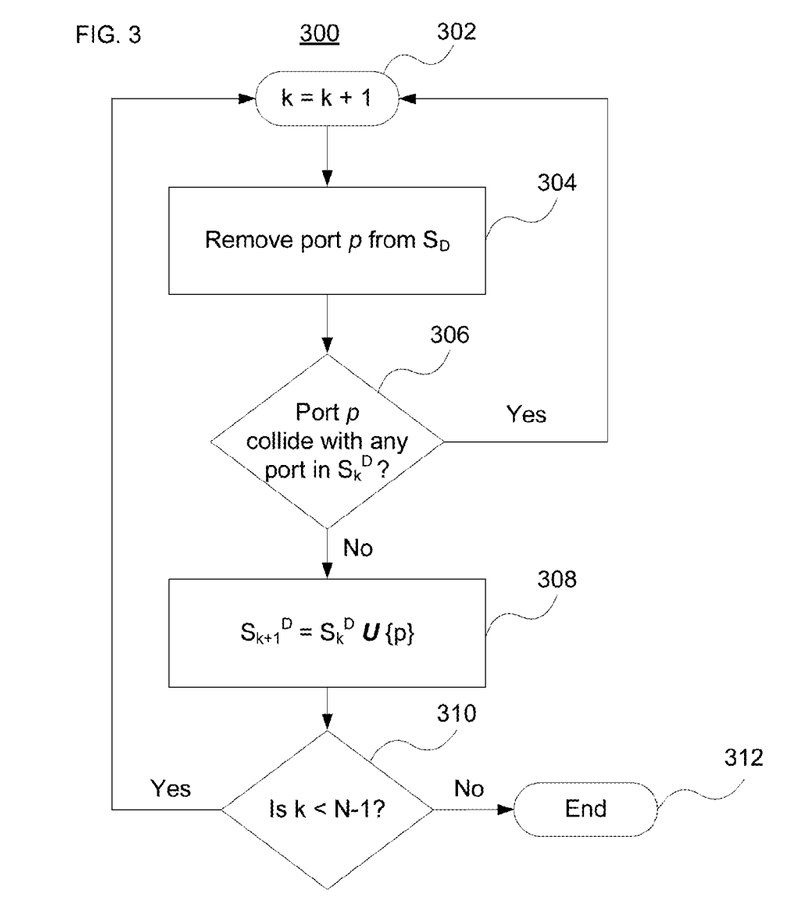
FIG. 3 is a flow diagram for identifying suitable paths to a given destination port according to aspects of the invention.

In one embodiment, a process is executed iteratively to arrive at a solution. FIG. 3 illustrates a flow diagram 300 for identifying multiple paths to a given destination device and a set of ports on the destination serving these paths. The process desirably executes iteratively for up to N−1 rounds. As shown in block 302, a counter k of the rounds is incremented (and which may be initialized to 0). In the $k^{th}$ round, the process starts with $S_k^D$, which is a subset of k ports in $S_D$ to serve traffic from the source device to the destination device over k unique paths. This is done to discover the $(k+1)^{th}$ path from the source to the destination, as well as a port p in $S_D$ to serve packets traversing this path. This process is desirably done by exchanging at least one probe pair or acknowledgement ("ACK") packet between the source device and the destination device.

In one example, two destination ports, namely $p_1$, and $p_2$, "collide" if packets destined to $p_1$ traverse the same path as those destined to $p_2$. The source device (e.g., router $R_0$ or source 202) searches for a port p in $S_D$ that does not collide with any ports in $S_k^D$, and eliminates ports from $S_D$ that collide with ports in $S_k^D$. First, in block 304 a port p is removed from $S_D$. Preferably, the port p is randomly selected for removal in block 304. Then, in block 306, it is determined if the port p just removed from $S_D$ collides with any port in $S_k^D$. If so, the removed port p is not added back to $S_D$ such that it is skipped in the next round k+1, and the process returns to block 302. If there is no collision, the process proceeds to block 308, where $S_{k+1}^D$ is assigned to be $S_{k+1}^D = S_k^D \cup p$. Here, port p is added to $S_{k+1}^D$. The "$\cup$" symbol in this equation is a union or addition operator.

As shown in block 310, if the counter k is less than N−1, then the process returns to block 302; otherwise it ends at block 312.

Figure 4:
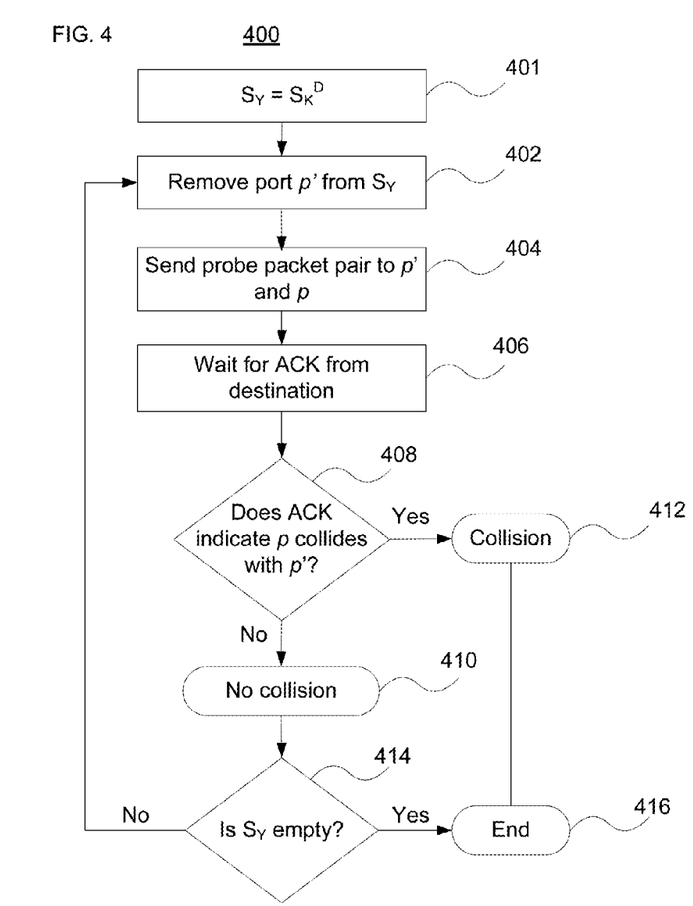
FIG. 4 is a flow diagram for determining collisions among ports of a destination node according to aspects of the invention.

To determine if a given port p collides with any port in $S_k^D$ without modifying $S_k^D$, the process 400 shown in FIG. 4 may be employed. First, as shown in block 401, a set of ports $S_Y$ is initialized to be the same as the set of ports in $S_k^D$. As shown in block 402, a port p' is removed from the set $S_Y$. The port p' is preferably randomly selected for removal from $S_Y$.

Next, as shown in block 404, for each port p' in $S_k^D$, a pair of probe packets is sent back to back via ports p' and p respectively. The size of the first probe packet is preferably a maximum transmission unit ($L_{MAX}$) supportable by the network between the source 202 and the destination 204, while the second probe is preferably of a minimum packet length ($L_{MIN}$) supported by the network between the source 202 and destination 204. The destination device 204 may send an acknowledgement ACK back to the source device 202, as shown in block 406.

As shown in block 408, the ACK may indicate whether the ports p and p' collide. In particular, if the destination device 204 received the two probe packets out of order, it is determined that ports p' and p do not collide at block 410. If the packets are received in order, it is determined that p' and p collide (e.g., port p collides with port p' in $S_K^D$) as shown in block 412.

As shown in block 414 if $S_Y$ is not empty, the process preferably returns to block 402 and repeats until a port p' is found in $S_Y$ that collides with p, or until it is determined that no ports in $S_Y$ collides with p. If $S_Y$ is empty or a collision is found, the process terminates at bock 416.

One of the propositions discussed above was that if two consecutive packets traverse different routes, they could arrive out of order at the destination. The probability of out of order delivery is maximized when the size of first probe is maximized and that of second probe is minimized.

To prove this observation, consider the following network model depicting two routes between a source node and a destination node. In this example, two probe packets, $P_1$ of length $L_1$, and $P_2$ of length $L_2$, are sent back to back from the source node to the destination node. The probe packets each traverses one of two routes, which may initially share certain routers, e.g., $R_0, R_1, \ldots R_l$. In this example, the two routes branch off after $R_l$ and re-merge at $R_m$. The transmission rate of a router R ($R \in \{R_i | 0 \leq i \leq l\} \cup \{R_i^1 | l < i \leq m\} \cup \{R_i^2 | l < i \leq m\}$) is r(R), and $Q^2(R)$ and $Q^1(R)$ represent the queuing delays experienced by $P_1$ and $P_2$ at R, respectively.

Assume there is no cross traffic and the queuing delay is zero for $P_1$ and $P_2$ at $R_0$ to $R_1$. It is straightforward to prove that:

$$T_l^2 - T_l^1 = \frac{L_2}{\min\{r(R_i) | 0 \leq i \leq L\}}$$

$T_l^2$ and $T_l^2$ are the arrival times of $P_1$ and $P_2$ at $R_1$, and $\min\{r(R_i) | 0 \leq i \leq l\}$ is the bandwidth of bottleneck link between $R_0$ and $R_1$. When there is cross traffic, $T_l^2 - T_l^1$, the dispersion of $P_1$ and $P_{er}$ can expand or compress. To express this phenomena, we let:

$$T_l^2 - T_l^1 = \frac{L_2}{\min\{r(R_i) | 0 \leq i \leq l\}} + \delta_c$$

Figure 5:
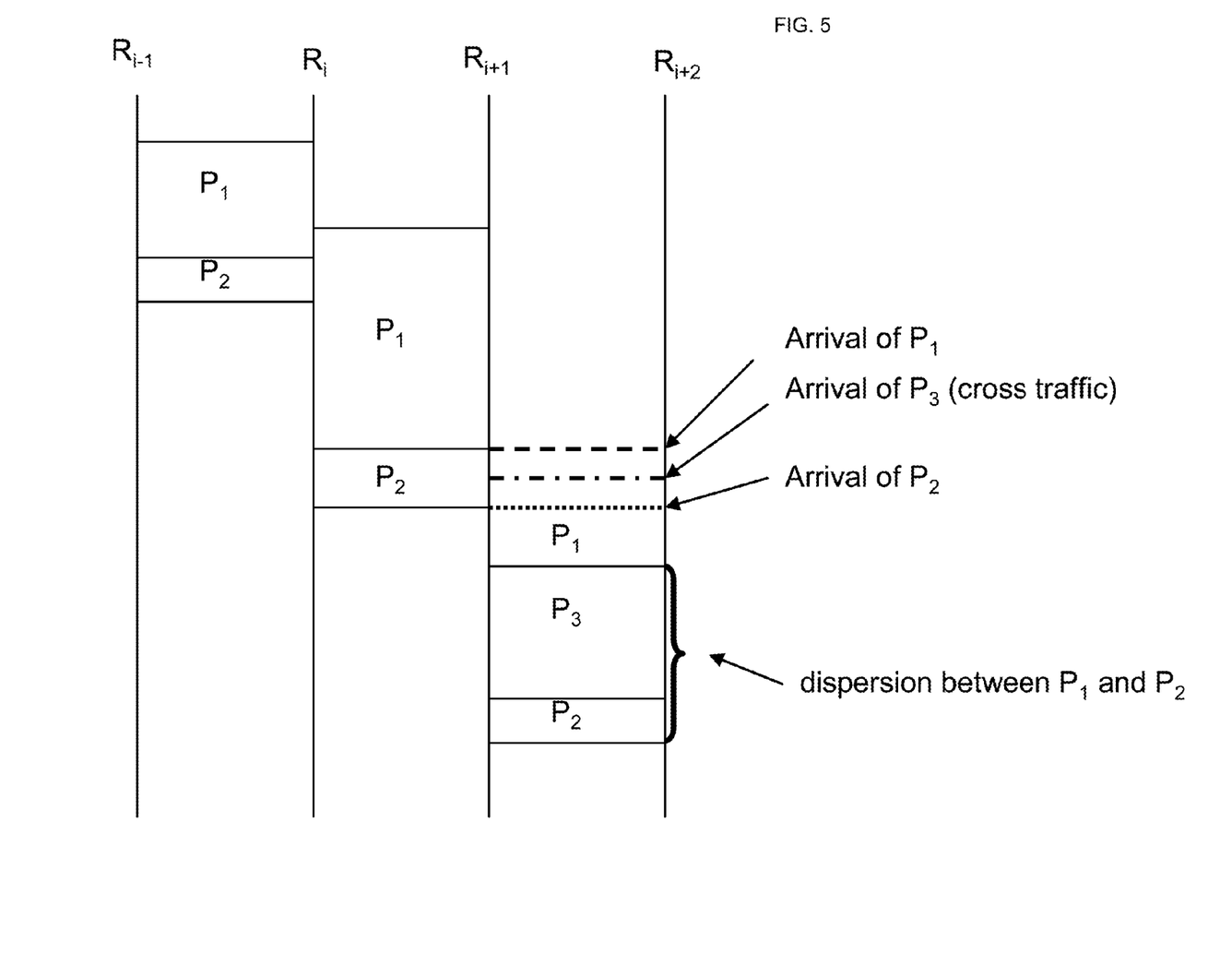
FIG. 5 illustrates cross traffic increasing dispersion in a network.

Cross traffic, such as a packet $P_3$ may be serviced in between $P_1$ and $P_2$. As shown in FIG. 5, if this occurs, then the dispersion between $P_1$ and $P_2$ increases. The probability of such cross traffic expanding the dispersion of $P_1$ and $P_2$ decreases with the length $L_2$ of packet $P_2$. Thus, if the length $L_2$ of packet $P_2$ is minimized, the probability of cross traffic packet $P_3$ increasing the dispersion between $P_1$ and $P_2$ is minimized.

Figure 6:
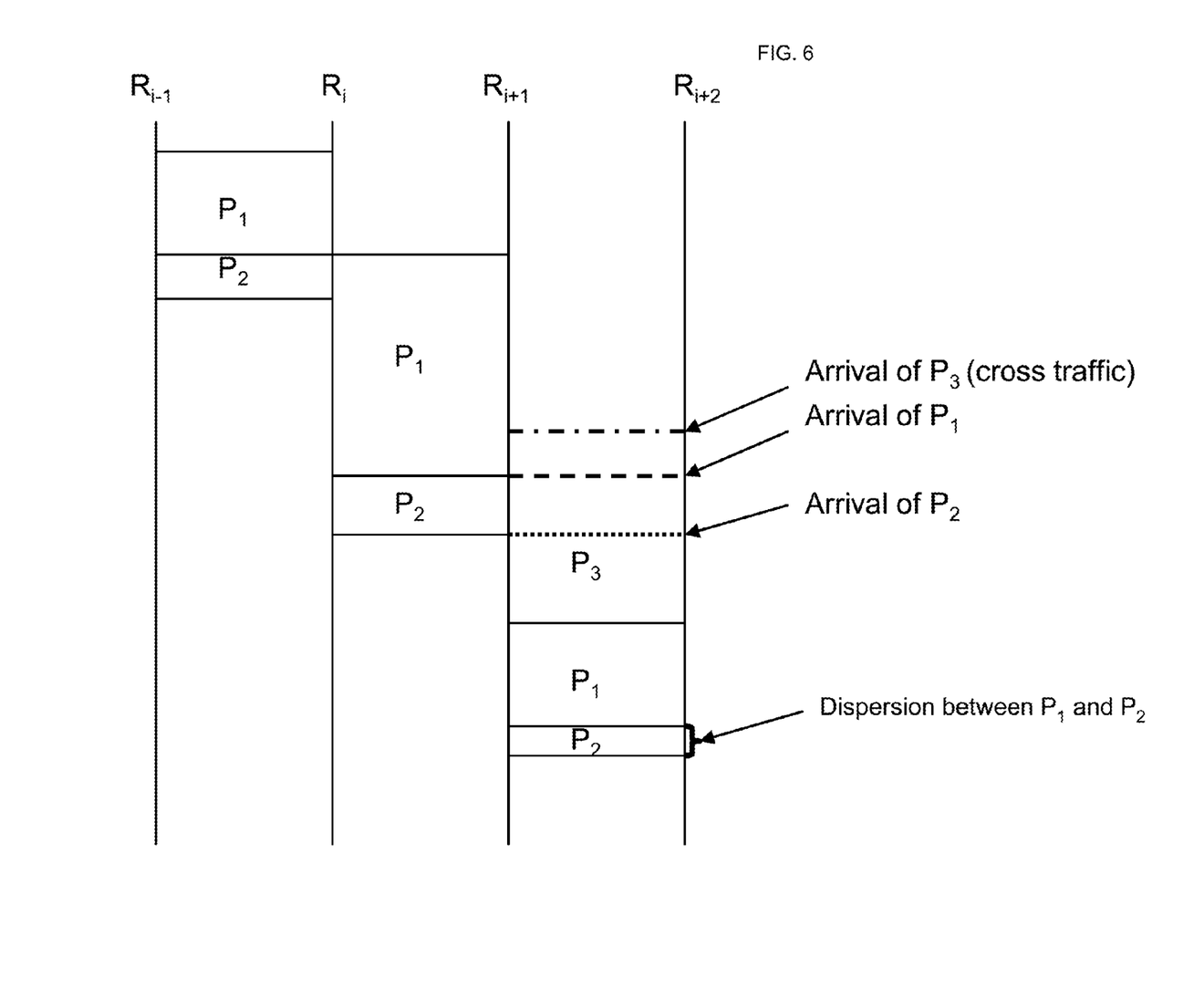
FIG. 6 illustrates cross traffic decreasing dispersion in a network.

If cross traffic $P_3$ is serviced before $P_1$ as shown in FIG. 6, the dispersion of $P_1$ and $P_2$ is decreased. The probability of such cross-traffic $P_3$ decreasing the dispersion of $P_1$ and $P_2$ increases with the length $L_1$ of packet $P_1$. Furthermore, it can be proved that:

$$T_l^2 - T_l^1 \geq \frac{L_2}{\max\{r(R_i) | 0 \leq i \leq l\}}$$

Hence:

$$\frac{L_2}{\max\{r(R_i) | 0 \leq i \leq l\}} \leq T_l^2 - T_l^1 \leq \frac{L_2}{\min\{r(R_i) | 0 \leq i \leq l\}}$$

Thus $T_l^2 - T_l^1$ is minimized if $L_2$ is minimized and $L_1$ is maximized. Next, $T_m^1$ and $T_m^2$, the arrival times of $P_1$ and $P_2$ at $R_m$, respectively, and the condition for $T_m^1 > T_m^2$, that is $P_2$ arrives at $R_m$ and eventually at the destination node before $P_1$ are derived. In particular:

$$T_m^1 = T_l^1 + Q^1(R_l) + \frac{L_1}{r(R_l)} + \sum_{l+1 \leq i \leq m} Q^1(R_i^1) + \frac{L_1}{r(R_i^1)}$$

$$T_m^2 = T_l^2 + Q^2(R_l) + \frac{L_2}{r(R_l)} + \sum_{l+1 \leq i \leq m} Q^2(R_i^2) + \frac{L_2}{r(R_i^2)}$$

$T_m^2 < T_m^1$ if and only iff:

$$T_l^2 - T_l^1 < Q^1(R_l) - Q^2(R_l) + \frac{L_1 - L_2}{r(R_l)} +$$
$$\sum_{l+1 \leq i \leq m} Q^1(R_i^1) + \sum_{l+1 \leq i \leq m} \frac{L_1}{r(R_i^1)} - \sum_{l+1 \leq i \leq m} Q^2(R_i^2) - \sum_{l+1 \leq i \leq m} \frac{L_2}{r(R_i^2)}$$

In the above formula, when $L_1$ is maximized and $L_2$ is minimized, $T_l^2 - T_l^1$ is minimized, and $$\frac{L_1 - L_2}{r(R_l)} + \sum_{l+1 \le i \le m} \frac{L_1}{r(R_i^1)} - \sum_{l+1 \le i \le m} \frac{L_2}{r(R_i^2)}$$

is maximized. Assume the sum of queuing delays experienced by $P_1$ and $P_2$, $$Q^1(R_l) + \sum_{l+1 \le i \le m} Q^1(R_i^1), \text{ and } Q^2(R_l) + \sum_{l+1 \le i \le m} Q^2(R_i^2),$$

are independent of $L_1$ and $L_2$. The probably of $T_m^2 < T_m^1$ is maximized when $L_1$ is maximized and $L_2$ is minimized.

It can be further proved that if between $R_m$ and the destination node, $P_1$ and $P_2$ traverse on different routes, the lead time of $P_2$ over $P_1$ is also maximized when is $L_1$ maximized and $L_2$ is minimized.

With regard to the third proposition, if two consecutive probe packets $P_1$ and $P_2$ of length $L_{max}$ and $L_{min}$ (denoting the largest and smallest packet length supported by the network's nodes) traverse different routes yet arrive in order at the destination, the path traversed by $P_2$ experience much larger queuing and/or transmission delay than $P_1$. It is thus of little gain to split the application traffic across the two paths traversed by $P_1$ and $P_2$, since the throughput improvement is marginal.

When $L_1 = L_{max}$ and $L_2 = L_{min}$, the probability of cross traffic in between $P_1$ and $P_2$ is close to zero, and it may be assumed that:

$$\frac{L_2}{\max\{r(R_i) | 0 \le i \le l\}} \le T_l^2 - T_l^1 \le \frac{L_2}{\min\{r(R_i) | 0 \le i \le l\}}$$

$$T_l^2 - T_l^1 + \sum_{l \le i \le m} Q^2(R_i^2) - \sum_{l \le i \le m} Q^1(R_i^1) + Q^2(R_l) -$$

$$Q^1(R_l) + \sum_{l \le i \le m} \frac{L_2}{r(R_i^2)} - \sum_{l \le i \le m} \frac{L_1}{r(R_i^1)} + \frac{L_2 - L_1}{r(R_l)} > 0$$

$$\frac{L_2}{\min\{r(R_i) | 0 \le i \le l\}} + \sum_{l \le i \le m} Q^2(R_i^2) - \sum_{l \le i \le m} Q^1(R_i^1) + Q^2(R_l) -$$

$$Q^1(R_l) + \sum_{l \le i \le m} \frac{L_2}{r(R_i^2)} - \sum_{l \le i \le m} \frac{L_1}{r(R_i^1)} + \frac{L_2 - L_1}{r(R_l)} > 0$$

If the queuing delays of $P_1$ and $P_2$ are equal, $$\frac{L_2}{\min\{r(R_i) | 0 \le i \le l\}} + \sum_{l \le i \le m} \frac{L_2}{r(R_i^2)} + \frac{L_2}{r(R_l)} - \sum_{l \le i \le m} \frac{L_1}{r(R_i^1)} - \frac{L_1}{r(R_l)} > 0$$

Once a pair of non-colliding ports has been found, the system may configure packet transmission to send one or more packets along the different routes from the source node to the destination node. In one alternative, the system evaluates the network to determine whether more than two non-colliding destination ports are present. If so, the packet traffic may be split among all non-colliding routes.

Furthermore, the processes discussed herein, such as the operations discussed with regard to FIGS. 3 and 4, may be performed by one or more processors in the system. By way of example only, processing may be performed by the source device 202, destination device 204 or one of the routers 206 of FIG. 2. The processor(s) may execute a program recorded/ stored on a computer-readable recording medium, such as ROM, RAM, flash memory, CD-ROM, DVD-ROM or the like.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. A method for identifying ports to support data packet traffic between a source device and a destination device in a computer network, the method comprising:
   selecting a subset $S_k^D$ from a set $S_D$ of destination ports p the destination device is configured to listen to, the subset $S_k^D$ for serving the data packet traffic between the source device and the destination device;
   choosing a port in the set $S_D$ for analysis that is not a member of the subset $S_k^D$;
   determining whether the chosen port collides with any of the ports in the subset $S_k^D$ by analyzing one or more pairs of packets transmitted to the destination device and evaluating whether the packets from at least one of the pairs arrive out of order; wherein,
   when there is a collision involving the chosen port, eliminating the chosen port from the set $S_D$; and
   when it is determined that there is no collision, modifying the subset $S_K^D$ according to the following equation: $S_{K\ modified}^D = S_K^D \cup \{\text{chosen port}\}$, wherein U indicates a union operation.

2. The method of claim 1, further comprising repeating the selecting, choosing, determining and eliminating operations for one or more rounds, wherein a new port is chosen in each of the one or more rounds.

3. The method of claim 2, wherein after each port that does not collide with any of the ports in the subset $S_D^K$ is identified, the method further comprises sending the data packet traffic from the source device to the destination device via at least two of the non-colliding ports.

4. The method of claim 1, wherein for a given one of the one or more pairs of packets, a first packet of the given pair is of a maximum packet transmission size.

5. The method of claim 4, wherein a second packet of the given pair of packets is of a minimum packet transmission size.

6. The method of claim 1, wherein the chosen port is randomly selected from the set $S_D$.

7. The method of claim 1, wherein the destination device sends an acknowledgement to the source device upon the arrival of the one or more pairs of packets.

8. A processing system for transmission of data packets between a source device and a destination device in a computer network, the computer network including a plurality of nodes for routing the data packets between the source and destination devices, the processing system comprising:
   a memory for storing data; and
   a processor operatively coupled to the memory for reading the data from and writing the data to the memory, the processor being configured to select a subset $S_k^D$ from a set $S_D$ of ports p the destination device is configured to listen to, the subset $S_k^D$ being configured to serve the data packets between the source device and the destination device, the processor being further configured to choose a port in the set $S_D$ for analysis that is not a member of the subset $S_k^D$, to determine whether the chosen port collides with any of the ports in the subset $S_k^D$ by analyzing one or more pairs of packets transmitted to the destination device and evaluating whether the packets from at least one of the pairs arrive out of order, wherein, when there is a collision involving the chosen port, the processor eliminates the chosen port from the set $S_D$; and when it is determined that there is no collision, the processor modifies the subset $S_k^D$ according to the following equation: $S_{K\,modified}^D = S_k^D \cup \{\text{chosen port}\}$, wherein U indicates a union operation.

9. The processing system of claim 8, wherein the processor comprises the source device.

10. The processing system of claim 8, wherein the processor is further configured to repeating the selecting, choosing, determining and eliminating operations for one or more rounds, wherein a new port is chosen in each of the one or more rounds.

11. The processing system of claim 10, wherein after each port that does not collide with any of the ports in the subset $S_D^K$ is identified, the system is configured to send the data packets from the source device to the destination device via at least two of the non-colliding ports.

12. The processing system of claim 8, wherein for a given one of the one or more pairs of packets, a first packet of the given pair is of a maximum packet transmission size.

13. The processing system of claim 12, wherein a second packet of the given pair of packets is of a minimum packet transmission size.

14. The processing system of claim 8, wherein the chosen port is randomly selected from the set $S_D$.

15. The processing system of claim 8, wherein the source device is configured to receive an acknowledgement from the destination device upon the arrival of the one or more pairs of packets.

* * * * *